Aug. 26, 1969 C. C. INGALLS 3,462,929
SELF-PROPELLED SIDE DELIVERY RAKE
Filed March 27, 1967 4 Sheets-Sheet 3

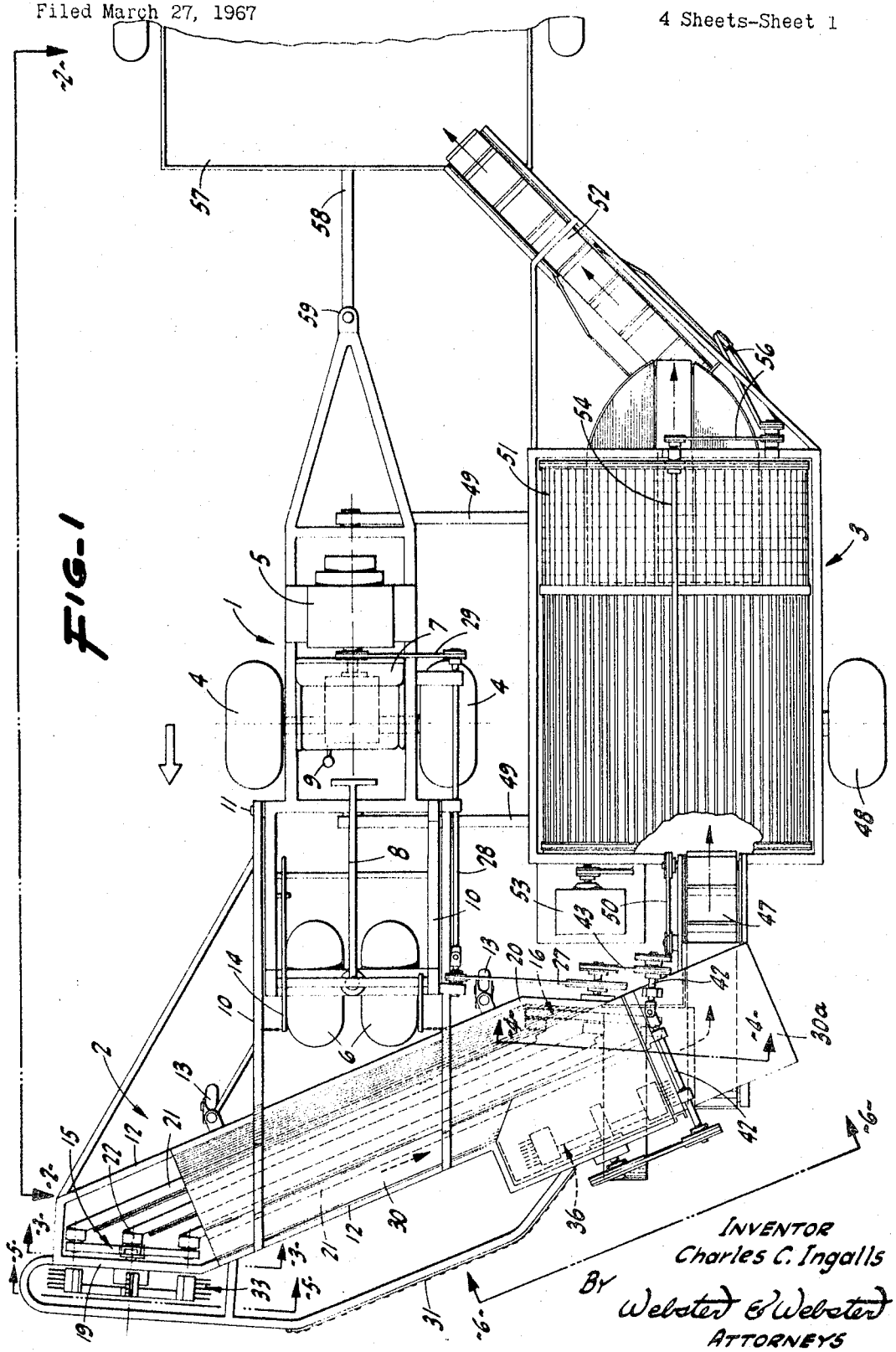

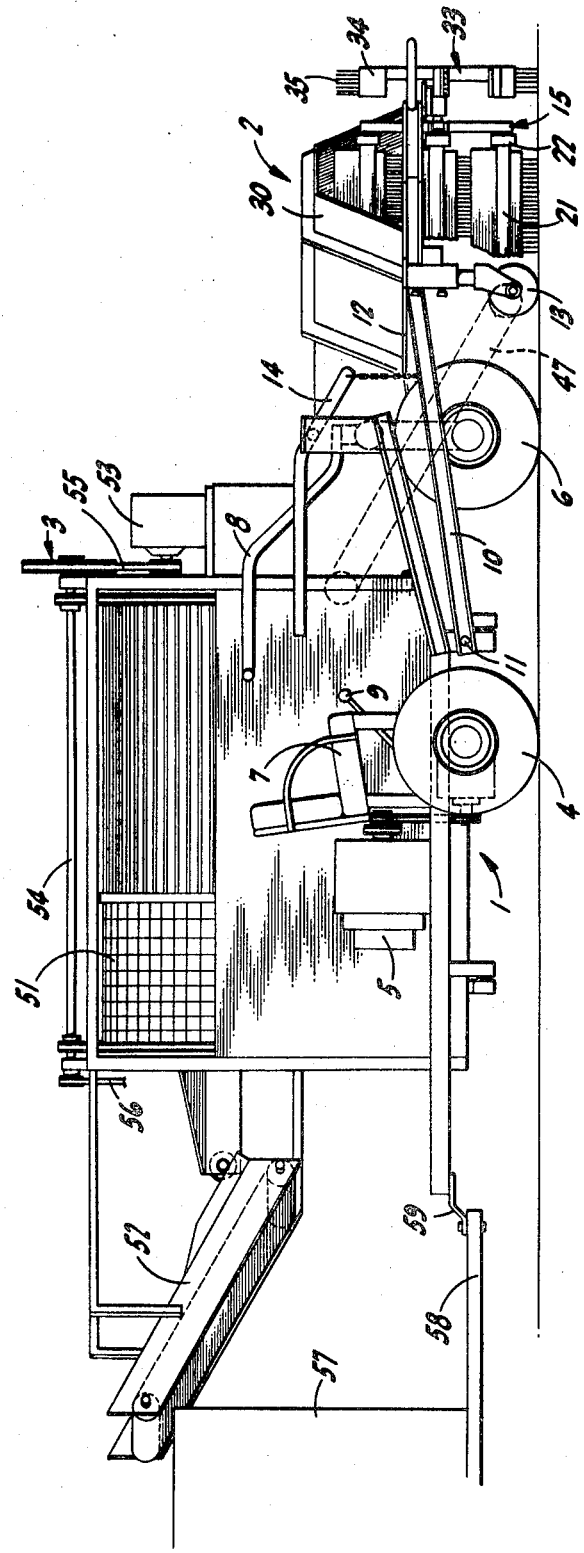

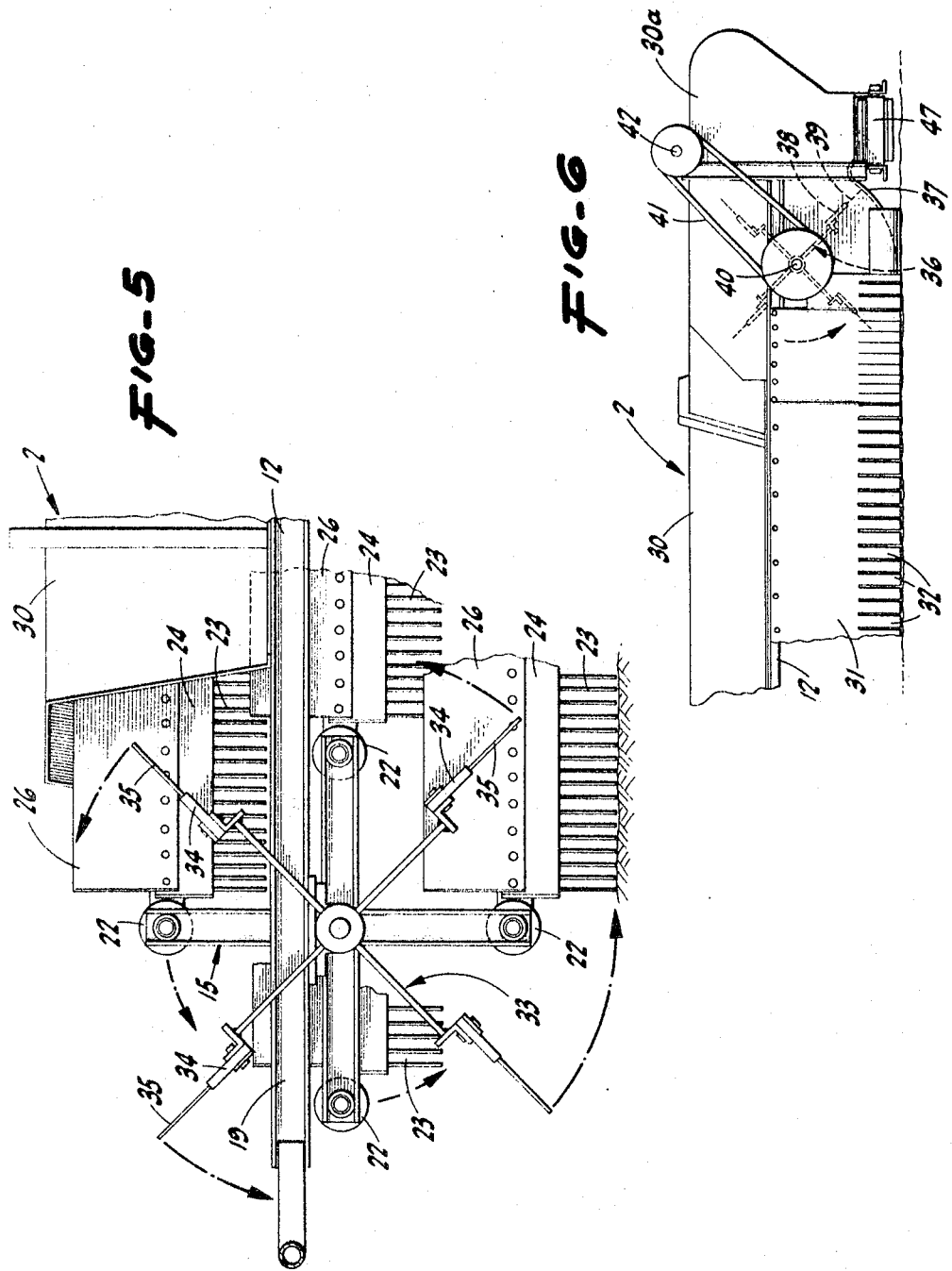

United States Patent Office 3,462,929
Patented Aug. 26, 1969

3,462,929
SELF-PROPELLED SIDE DELIVERY RAKE
Charles C. Ingalls, 3042 Washington Road,
Ceres, Calif. 95307
Filed Mar. 27, 1967, Ser. No. 626,009
Int. Cl. A01g 19/00
U.S. Cl. 56—328          5 Claims

ABSTRACT OF THE DISCLOSURE

A self-propelled side delivery rake especially adapted, but not limited, for use to sweep on-the-ground nuts (or fruit) laterally to a certain point for pick-up; the implement including an elongated, transverse raking reel disposed diagonally of the direction of travel and driven in a manner to effectively sweep the nuts, as encountered by the reel, laterally to and for discharge from the trailing end of such reel. A nut (or fruit) cleaning machine is disposed, in detachably connected relation to the rake, adjacent but rearwardly of the trailing end of the reel, and means being provided to feed the nuts (or fruits)—as discharged from said end of the reel—into said cleaning machine.

Background of the invention

In side delivery rakes, as heretofore provided for the described purpose, the raking reel has in many instances not been wholly effective in that the sweeping action thereof was not as positive as desired and the amount of passed or skipped nuts tended to exceed that permissible for a practical and economical operation. The present invention treats with improvement of the raking reel and provides associated features of novelty as will hereinafter appear.

Summary of the invention

The present invention provides, as a major object, a self-propelled side delivery rake wherein the included diagonally disposed raking reel is of improved construction and functions with an action which causes the included flexible and resilient sweep fingers to act on the encountered nuts—as the implement advances—in a manner to positively and progressively move such nuts laterally, and with a minimum of loss, to the trailing end of such reel for discharge therefrom.

The present invention provides, as another object, a driven paddle wheel unit mounted directly ahead of the leading end of the raking reel for rotation in a transverse vertical plane; such paddle wheel unit assuring that nuts lying in the path of the leading end of the raking reel will be swept into the main path of said reel.

The present invention provides, as an additional object, a self-propelled side delivery rake in combination with a trommel-type nut precleaning machine which is disposed directly to the rear of the trailing end of the raking reel; there being novel means, including another driven paddle wheel unit, operative to continuously feed the nuts—as discharged from said trailing end of the raking reel—to the driven separator mechanism of said precleaning machine. The arrangement is such, however, that the precleaning machine and related nut-feeding means can be readily detached to permit of separate use of the rake if it be desired to merely windrow the nuts on the ground immediately beyond the trailing end of the reel.

The present invention provides, as a further object, a self-propelled side delivery rake which is designed for ease and economy of manufacture.

The present invention provides, as a still further object, a practical, reliable, and durable self-propelled side delivery rake and one which is exceedingly effective for the purpose for which it is designed.

Brief description of the drawings

FIG. 1 is a plan view of the entire implement.
FIG. 2 is a side elevation of the same; the view being taken on line 2—2 of FIG. 1.
FIG. 5 is an enlarged but fragmentary, transverse elevation on line 5—5 of FIG. 1; the raking reel being shown as rotated forty-five degrees from the position thereof in FIGS. 3 and 4.
FIG. 6 is a fragmentary transverse elevation on line 6—6 of FIG. 1.

Description of the preferred embodiment

Figure 4:
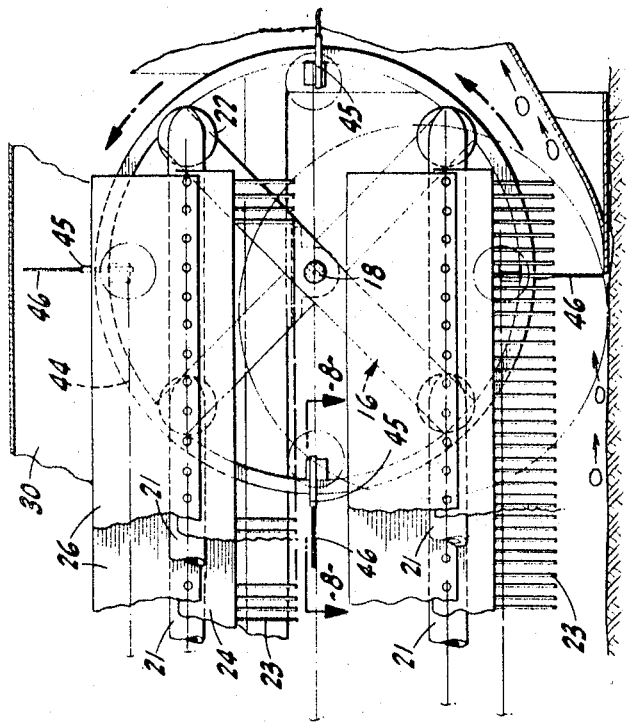
FIG. 4 is an enlarged but fragmentary, transverse sectional elevation on line 4—4 of FIG. 1.

Referring now more particularly to the drawings and to the characters of reference marked thereon, the general assembly of the implement includes a self-propelled, wheel-supported mobile frame 1, an elongated raking reel 2 disposed in transversely diagonal relation in front of the mobile frame 1, and a nut precleaning machine 3 disposed to the rear of the trailing end of the raking reel 2 and alongside said mobile frame.

The self-propelled mobile frame 1 includes rear wheels 4 driven from an engine 5, and front wheels 6 steerable from an operator's seat 7 by means of a tiller 8; the drive to the rear wheels 4 being controlled by a hand lever 9 also accessible from the seat 7.

A pair of longitudinal, transversely spaced push arms 10 are pivotally connected, as at 11, to the mobile frame 1 on opposite sides and intermediate its ends; such push arms 10 projecting ahead of the mobile frame and being fixed on the frame 12 for the raking reel 2. In this fashion the raking reel 2 is advanced along the ground by the self-propelled mobile frame 1; the raking reel being stabilized in ground engagement by caster wheels 13 mounted at the rear of frame 12.

When the implement is making a turn, or for travel with the raking reel out of use, the latter is raised about pivots 11 to a position clear of the ground; this being accomplished by suitable lever-operated lift mechanism such as a pivoted lever and suspension assembly 14 mounted at the front end of the mobile frame 1 and connected to the push arms 10.

The raking reel 2 comprises—within the frame 12—a leading end rotor 15 and a trailing end rotor 16; such rotors being disposed and rotating in longitudinally spaced but parallel transverse planes. The respective rotor shafts 17 and 18 are thus parallel and extend in the direction of travel. These rotor shafts are journaled, as shown, in connection with related adjacent members 19 and 20 of the frame 12.

The rotors 15 and 16 are of four-legged spider form, and elongated rake bars 21 span between and are crank-journaled, as at 22, in connection with the outer ends of corresponding legs of said rotors.

Each rake bar 21 is provided, for substantially its full length, with a depending row of flexible and resilient rake fingers 23 disposed in close side-by-side relation, these fingers facing forwardly and being of stiff material such as rubber. Each row of fingers 23 includes, at the top, a heavy-duty attachment strip 24 secured to the related rake bar 21 by bolts 25; the bolts 25 also securing to each bar 21 an upstanding baffle plate 26 which likewise extends substantially full length of said bar. The baffle plates 26 prevent nuts, as swept by the raking reel, from escaping rearwardly over the rake bars 21.

The raking reel is actuated, and so as to turn forwardly at the bottom, in the following manner:

The shaft 18 of rotor 16 is extended rearward and driven by an endless belt 27 from a countershaft 28 operated from engine 5 by an endless belt 29.

For a substantial portion of its length, the raking reel includes a top hood 30 suitably mounted on the frame 12, and a flexible drape 31 depends from the front of said frame to prevent nuts—as swept by the raking reel—being thrown ahead of the implement as it advances. The lower portion of the drape 31 is provided with a multiplicity of vertical slits to provide in effect, a multiplicity of flexible fingers 32 which permit the drape to engage, yield and then pass over nuts on the ground without rolling them ahead any appreciable extent.

A paddle wheel unit 33 is mounted, for rotation in a transverse vertical plane, on a forward extension of shaft 17; such paddle wheel unit 33 thus being disposed in front of the leading end of the raking reel. The paddle wheel unit 33 includes circumferentially spaced, laterally facing paddles 34 having outwardly projecting, side-by-side flexible and resilient fingers 35.

The diameter and position of the paddle wheel unit 33 is such that it engages the ground and provides an effective laterally inward sweeping action immediately ahead of the leading end of the raking reel; the purpose being to assure that nuts in the path of said leading end of the raking reel are effectively engaged and swept into the main path of said reel for raking by the latter.

As the implement advances, with the raking reel turning forwardly at the bottom, the rake bars 21 do not individually rotate and consequently maintain the same relative rotative positions at all times. Thus, the depending rows of flexible and resilient rake fingers 23 successively reach the ground and there not only sweep forwardly but also simultaneously shift laterally in the direction of the trailing end of the raking reel; such lateral shifting being caused by the particular arrangement of the rotors 15 and 16 and the manner of journaling the rake bars thereon, as previously described.

Figure 3:
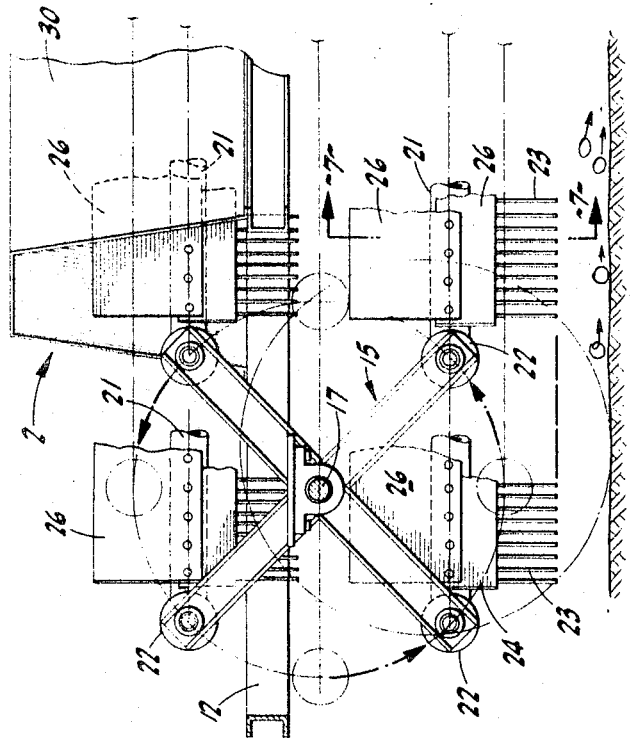
FIG. 3 is an enlarged but fragmentary, transverse sectional elevation on line 3—3 of FIG. 1.
Figure 7:
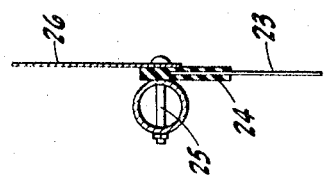
FIG. 7 is a fragmentary transverse section on line 7—7 of FIG. 3.

The forward sweeping and lateral shifting of each row of fingers 23 when engaged with the ground, together with the diagonal disposition of the raking reel as a whole relative to the direction of travel, results in the nuts in the path of the raking reel being engaged and swept laterally—mainly with a rolling action—to the trailing end of such raking reel. See FIGS. 3 and 4.

As the nuts reach the trailing end of the raking reel 2, such nuts are swept by a paddle wheel unit 36 up a transverse ramp 37; the paddle wheel unit 36 including laterally facing paddles 38 having outwardly projecting, side-by-side flexible and resilient fingers 39.

A stub shaft 40 is journaled on the frame 12 at a right angle to the axis of the raking reel and provides the rotary mount for the paddle wheel unit 36; such shaft 40 being driven by an endless belt 41 from a universal countershaft 42 which in turn is actuated by an endless belt 43 from the rear end of shaft 18. As so mounted and driven, the paddle wheel unit 36 turns laterally outwardly at the bottom and thus sweeps the nuts onto the ramp 37 as heretofore indicated. See FIG. 6.

Figure 8:
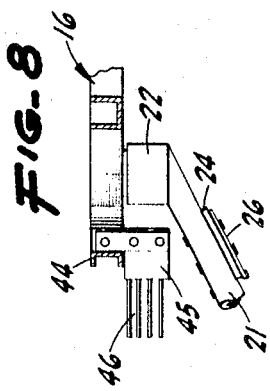
FIG. 8 is a fragmentary sectional plan view on line 8—8 of FIG. 4.

To further assure of free discharge at the trailing end of the raking reel, the rotor 16 is provided with a peripheral ring 44 fitted with circumferentially spaced paddles 45 having outwardly projecting, side-by-side flexible and resilient fingers 46; the latter sweeping in the direction of ramp 37. See FIGS. 4 and 8.

Upon the nuts being swept up the ramp 37, they deliver therefrom onto the lower and portion of the upper run of an endless conveyor 47 which extends at an upward and rearward incline to (and feeds into) the forward and receiving end of the nut precleaning machine 3.

In the present embodiment, the machine 3 is wheel-supported on the outboard side as at 48, while on the inboard side it is detachably connected by lateral bars 49 to the mobile frame 1. At the front of the machine 3 detachable draft connection with the trailing end of frame 12 is provided by suitable means including the frame of conveyor 47. It is to be noted that by detaching the bars 49 from the mobile frame 1, and also detaching conveyor 47 from frame 12, accompanied by removal of paddle wheel unit 36, the implement can be employed merely to windrow the nuts at the trailing end of the raking reel.

The endless conveyor 47 is driven, with its upper run traveling toward the machine 3, by means of an endless belt 50 trained to and actuated by shaft 42. The forward portion of conveyor 47 is covered by a hood 30a which extends inwardly, as shown, to mate with the adjacent end portion of hood 30 and to also enclose the paddle wheel unit 36.

The nut precleaning machine 3 is constructed and functions the same as shown and described in my United States Patent No. 3,132,365; the nuts being initially received from conveyor 47 in a squirrel-cage trommel 51. After passage of the nuts through the machine 3, and wherein by means of said trommel 51 and instrumentalities therein the initially intermingled leaves, dirt, and debris are separated from such nuts, the latter discharge in relatively clean condition onto a carry-off conveyor 52 supported on said machine 3. As shown, such machine 3 is independently driven by an engine 53 which rotates a main shaft 54 by means of an endless belt 55. The carry-off conveyor 52 is operated from shaft 54 by an endless belt assembly 56.

The carry-off conveyor 52 is disposed not only at an upward and rearward incline but is diagonaled laterally inwardly whereby its upper end is positioned over and discharges the nuts into a bin-type trailer 57 having a tongue 58 connected in draft relation to the rear of mobile frame 1 by a hitch 59. With the described combination implement, nuts (previously knocked from the trees and lying on the ground) are effectively and economically gathered, precleaned, and loaded into a transport container; all in a single pass of the implement.

From the foregoing description, it will be readily seen that there has been produced such a self-propelled side delivery rake as substantially fulfills the objects of the invention, as set forth herein.

While this specification sets forth in detail the present and preferred construction of the self-propelled side delivery rake, still in practice such deviations from such detail may be resorted to as do not form a departure from the spirit of the invention, as defined by the appended claims.

I claim:

1. A self-propelled side delivery rake comprising a wheel-supported mobile frame having a driving engine and an operator's seat thereon, an elongated raking reel disposed in front of the mobile frame in transversely diagonal relation to the direction of travel thereof, means mounting the raking reel in connection with the mobile frame for pushing advance thereby, and power transmission means to drive the raking reel from the engine on the mobile frame; there being a produce cleaning machine disposed adjacent but rearwardly of the trailing end of the raking reel, means connecting said machine to and for advance with the mobile frame, and means to feed into said cleaning machine the produce discharged from said trailing end of the raking reel.

2. A self-propelled side delivery rake, as in claim 1, in which said feeding means includes a driven paddle wheel unit mounted in association with the trailing end of the raking reel and operative to sweep said discharged produce in a certain direction, and a driven elevator conveyor onto which the produce as so swept is received; said conveyor feeding the produce to the cleaning machine.

3. A self-propelled side delivery rake comprising a wheel-supported mobile frame having a driving engine and an operator's seat thereon, an elongated raking reel disposed in front of the mobile frame in transversely diagonal relation to the direction of travel thereof, means mounting the raking reel in connection with the mobile frame for pushing advance thereby, and power transmission means to drive the raking reel from the engine on the mobile frame; there being a driven paddle wheel unit disposed at the leading end of the raking reel, and means journaling the paddle wheel unit in association with the raking reel; said paddle wheel unit being positioned to sweep produce laterally inwardly from substantially the path of the said leading end of the raking reel.

4. A self-propelled side delivery rake, as in claim 3, in which the paddle wheel unit includes a plurality of paddles each of which embodies flexible and resilient ground-engaging fingers disposed in side-by-side relation in the direction of travel.

5. A self-propelled side delivery rake comprising a wheel-supported mobile frame having a driving engine and an operator's seat thereon, an elongated raking reel disposed in front of the mobile frame in transversely diagonal relation to the direction of travel thereof, means mounting the raking reel in connection with the mobile frame for pushing advance thereby, and power transmission means to drive the raking reel from the engine on the mobile frame; there being a driven paddle wheel unit at the leading end of the raking reel, and means journaling the paddle wheel unit in association with the raking reel and in a position to sweep produce laterally inwardly from substantially the path of said leading end of the raking reel; another driven paddle wheel unit at the trailing end of the raking reel, means journaling said other paddle wheel unit in association with the raking reel and in a position to sweep produce discharged from the trailing end of said raking reel, a produce cleaning machine disposed adjacent but to the rear of the trailing end of the raking reel, means connecting said cleaning machine to and for advance with the mobile frame, and conveyor means arranged to receive and feed into said machine the produce swept by said other paddle wheel unit.

References Cited
UNITED STATES PATENTS

| | | | |
|---|---|---|---|
| 2,603,933 | 7/1952 | Shore | 56—27 |
| 2,780,904 | 2/1957 | Bowie et al. | 56—328 |
| 2,854,808 | 10/1958 | Ramacher et al. | 56—328 |
| 2,906,084 | 9/1959 | Weaver | 56—377 |
| 2,929,187 | 3/1960 | Boggio | 56—27 |
| 3,063,227 | 11/1962 | McCall et al. | 56—376 |
| 3,105,343 | 10/1963 | Anderson et al. | 56—328 |
| 3,148,494 | 9/1964 | Scheidenhelm | 56—400 |
| 3,308,613 | 3/1967 | Davidson | 56—328 |

RUSSELL R. KINSEY, Primary Examiner